No. 819,277. PATENTED MAY 1, 1906.
W. L. HOLMAN.
BRAKING APPARATUS.
APPLICATION FILED APR. 26, 1905.
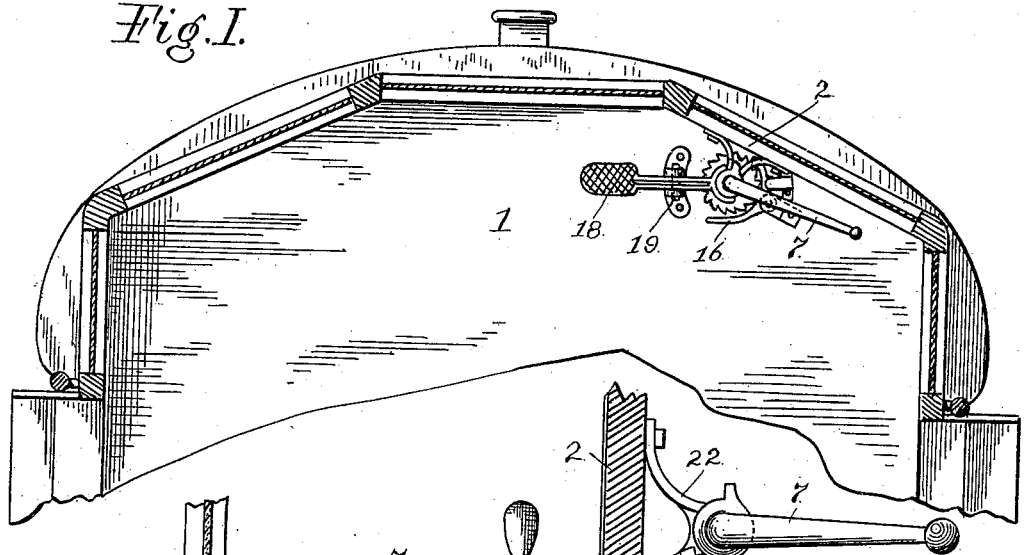
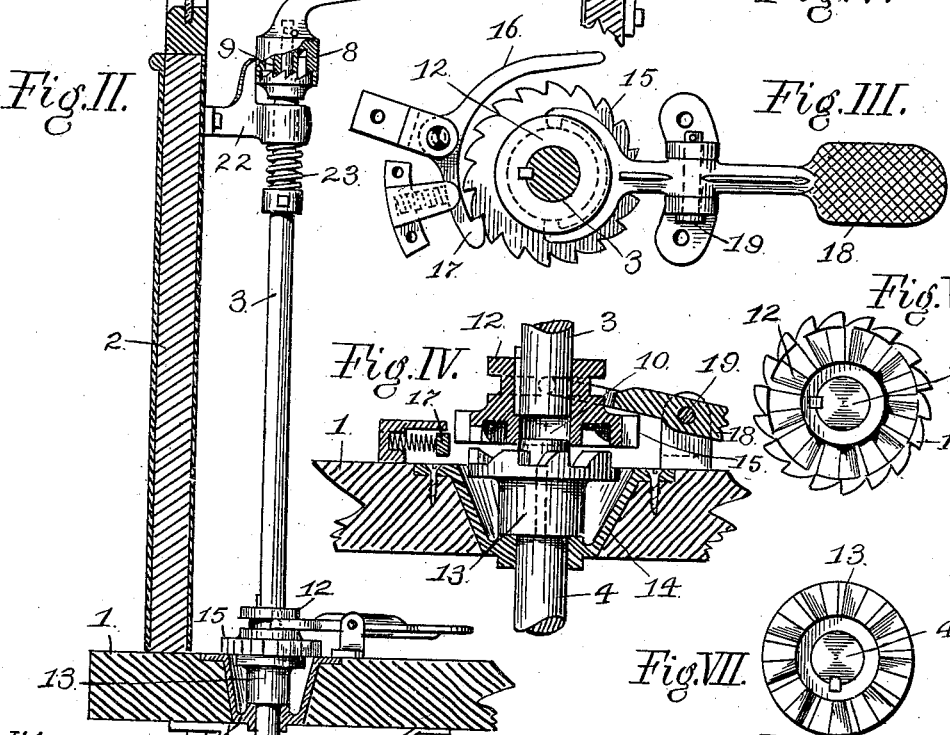
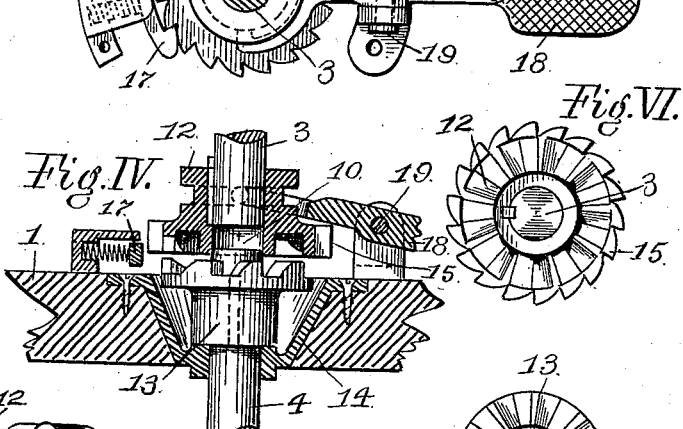
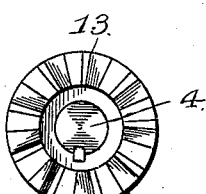
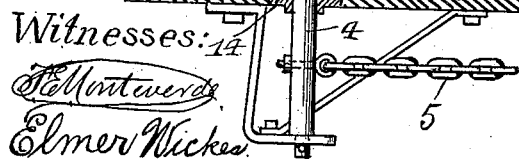
Witnesses:
H. Monteverde
Elmer Wickes
Inventor:
William L. Holman,
by J. Richards & Co.
Atty

UNITED STATES PATENT OFFICE.

WILLIAM L. HOLMAN, OF SAN FRANCISCO, CALIFORNIA.

BRAKING APPARATUS.

No. 819,277.            Specification of Letters Patent.            Patented May 1, 1906.

Application filed April 26, 1905. Serial No. 257,532.

*To all whom it may concern:*

Be it known that I, WILLIAM L. HOLMAN, a citizen of the United States of America, residing at San Francisco, county of San Francisco, and State of California, have invented certain new and useful Improvements in Braking Apparatus; and I hereby declare the following to be a full, clear, and exact description of the same, reference being had to the accompanying drawings, forming a part of this specification.

This invention relates to brakes for railway-carriages, especially for urban use, and to certain useful improvements therein, as hereinafter described, and illustrated by drawings that form a part of this specification.

My improvements consist in a clutched vibratory brake-handle that can be operated near to the wall of a carriage through a partial arc and a brake stem or shaft in two parts clutched together at the floor of the operating-platform of the carriage, that engages automatically and is released by a foot-treadle.

The objects of my invention are to save room in the operating-space required on such carriages and to provide for convenient manipulation of winding-brakes.

Referring to the drawings, Figure I is a broken plan view of the platform of a railway-carriage, showing my improved brake apparatus thereon. Fig. II is an enlarged side view of the same apparatus, partially in section. Fig. III is a top view of the main clutch and treadle to disengage the same. Fig. IV is an enlarged central section through the parts shown in Fig. III. Fig. V is an enlarged top view of the brake crank and bracket to support the brake-stem. Fig. VI is a bottom view of the top member of the main clutch. Fig. VII is a top view of the bottom member of the main clutch.

In the drawings, 1 is the platform-floor, and 2 the bulkhead or wall of the carriage; 3, the upper portion of the brake stem or shaft; 4, the bottom portion of the same, and 5 the winding-chain that operates the wheel-brakes in the usual manner.

The brake-handle 7 is provided with the usual clutch-motion, (indicated at 8 in Fig. II,) a series of pawls 9 permitting engagement at ten or more points of arc. These handles being common do not require a further description here.

The stem or shaft, composed of parts 3 and 4, is severed at 10, as indicated in Fig. IV, and on the upper portion 3 is fastened a clutch member 12, and on the lower portion 4 is fastened a corresponding clutch member 13, contained in a housing 14, embedded and fastened in the floor 1. When these two clutch members 12 and 13 are engaged, they are telescoped together, as shown in Fig. II, and the teeth 15 on the outside of the part 12 will be engaged by the pawl 17, arranged with a foot-pedal 16 for disengagement in the usual manner.

The main clutch at the floor of the platform is raised and disengaged from the one on the lower stem or shaft 4 by means of a foot-treadle 18, pivoted at 19, which raises the clutch member 12 until it frees the lower member 13 and the shaft 4, permitting the chain 5 to unwind, run back, and loosen the brakes.

The upper end of the shaft 3 is sustained in a bracket 22 and the lower end by the clutch member 12, splined upon and fitting loosely over the end of the stem or shaft 4, as shown in Fig. IV.

The operation is as follows: The parts being in the position shown in Fig. II, the attendant when the brakes are to be set turns the shaft 3 by a rotary motion of the handle 7, winding up the shaft 5, the pawl 17 engaging and holding the clutch member 12, the stems or shaft 3 and 4 acting the same as if in one piece or rigidly connected. In other words, the operating is the same as in the case of a common winding-brake. When the brake is to be released, the attendant places his foot on the treadle 18, presses this down, raising and disengaging the clutch members 12 and 13, so the stem 4 is free to turn, the chain 5 is slacked and runs back. When the treadle 18 is released, the gravity of the shaft 3, aided by the spring 23, causes this stem or shaft to fall again to the position shown in Fig. II, engaging the clutch members 12 and 13 ready for another operation.

Having thus described the nature and objects of my invention and the manner of its operation in practice, what I claim as new, and desire to secure by Letters Patent, is—

In braking apparatus, a vertical shaft made in two parts, a clutched crank-handle on top of the upper part, a winding-chain attached to the lower part, a socketed clutch member on the lower part, recessed in the platform, a ratcheted clutch member splined on the upper part, engaging with and telescoping said lower clutch member, a foot-lever for raising said ratcheted clutch member out of engagement, and a foot-pawl for engaging and holding said ratcheted clutch member against recession when in engagement with the lower clutch member, substantially as specified.

In testimony whereof I have signed my name to this specification in the presence of two subscribing witnesses.

WILLIAM L. HOLMAN.

Witnesses:
 ALFRED A. ENQUIST,
 ELMER WICKES.